(12) United States Patent
Cochran et al.

(10) Patent No.: US 11,052,435 B2
(45) Date of Patent: Jul. 6, 2021

(54) NARROWBAND DE-ICING AND ICE RELEASE SYSTEM AND METHOD

(75) Inventors: Don W. Cochran, Gates Mills, OH (US); Jonathan M. Katz, Solon, OH (US); Benjamin D. Johnson, Lyndhurst, OH (US); Denwood F. Ross, III, Austinburg, OH (US)

(73) Assignee: PRESSCO IP LLC, Cleveland, OH (US)

( * ) Notice: Subject to any disclaimer, the term of this patent is extended or adjusted under 35 U.S.C. 154(b) by 823 days.

(21) Appl. No.: 12/886,356

(22) Filed: Sep. 20, 2010

(65) Prior Publication Data

US 2011/0067726 A1 Mar. 24, 2011

Related U.S. Application Data

(60) Provisional application No. 61/243,669, filed on Sep. 18, 2009.

(51) Int. Cl.
*B08B 7/00* (2006.01)
*B64D 15/00* (2006.01)

(52) U.S. Cl.
CPC ............ *B08B 7/0042* (2013.01); *B64D 15/00* (2013.01)

(58) Field of Classification Search
CPC .................................................. B64D 15/00
See application file for complete search history.

(56) References Cited

U.S. PATENT DOCUMENTS

| | | |
|---|---|---|
| 3,781,526 A | 12/1973 | Damron |
| 4,678,144 A | 7/1987 | Goehner et al. |
| 4,900,891 A | 2/1990 | Vega et al. |
| 5,061,836 A | 10/1991 | Martin |
| 5,112,011 A | 5/1992 | Weisend, Jr. et al. |
| 5,610,930 A * | 3/1997 | Macomber et al. ............ 372/36 |
| 5,691,989 A | 11/1997 | Rakuljic et al. |
| 5,823,474 A | 10/1998 | Nunnally |
| 6,206,325 B1 | 3/2001 | Nunnally |
| 6,226,454 B1 | 5/2001 | Couture |
| 6,400,737 B1 * | 6/2002 | Broutin ................. H01S 5/0687 372/20 |
| 6,610,969 B2 | 8/2003 | Feher |
| 6,660,968 B1 * | 12/2003 | Mottelet .................. H05B 3/84 219/203 |
| 7,157,663 B1 | 1/2007 | Kismarton |

(Continued)

FOREIGN PATENT DOCUMENTS

| | | |
|---|---|---|
| JP | 04-254234 A | 9/1992 |
| JP | 2002-166778 A | 6/2002 |

(Continued)

OTHER PUBLICATIONS

International Search Report for PCT/US2010/049524 dated Nov. 9, 2010.

*Primary Examiner* — Mikhail Kornakov
*Assistant Examiner* — Ryan L Coleman
(74) *Attorney, Agent, or Firm* — Fay Sharpe LLP (57) ABSTRACT

A way of using narrowband irradiation to de-ice or release ice from a surface is provided. The methodology can be applied to a range of different types of de-icing from windshield de-icing to aircraft wing de-icing to releasing ice from the ice tray of an ice making machine. While there are many different specific applications, the concept and methodologies taught remain similar across all of them.

21 Claims, 5 Drawing Sheets

(56) References Cited

U.S. PATENT DOCUMENTS

| | | |
|---|---|---|
| 7,425,296 B2 | 6/2008 | Cochran et al. |
| 2003/0010988 A1* | 1/2003 | Franson .................. H01L 27/15 257/88 |
| 2003/0122037 A1 | 7/2003 | Hyde et al. |
| 2003/0147159 A1 | 8/2003 | Dube et al. |
| 2005/0274398 A1* | 12/2005 | Fonville .................. B60S 1/482 134/34 |
| 2006/0280825 A1 | 12/2006 | Cochran et al. |
| 2007/0096352 A1 | 5/2007 | Cochran et al. |
| 2009/0102083 A1 | 4/2009 | Cochran et al. |
| 2011/0002675 A1 | 1/2011 | Cochran et al. |
| 2011/0002677 A1 | 1/2011 | Cochran et al. |
| 2011/0006462 A1 | 1/2011 | Cochran et al. |
| 2011/0044670 A1 | 2/2011 | Cochran et al. |

FOREIGN PATENT DOCUMENTS

| | | |
|---|---|---|
| JP | 2004-111765 A | 4/2004 |
| WO | WO 2006/128102 A2 | 11/2006 |

\* cited by examiner

NARROWBAND DE-ICING AND ICE RELEASE SYSTEM AND METHOD

This application is based on and claims priority to U.S. Provisional Application No. 61/243,669, filed Sep. 18, 2009, which is incorporated herein by reference in its entirety.

BACKGROUND OF THE INVENTION

This invention relates to a specific way of using narrowband irradiation to de-ice or release ice from a surface. The methodology can be applied to a range of different types of de-icing from windshield de-icing to aircraft wing de-icing to releasing ice from the ice tray of an ice making machine. While there are many different specific applications, the concept and methodologies taught remain similar across all of them.

Historically, many different methodologies have been employed for addressing the problems of ice or the control of ice. The formation of ice can either be purposeful or problematic depending on the circumstances—but the desire to deal with ice in a controlled way is well documented in everyday living as well as the patent database. While it is beyond the scope of this teaching to detail all historical methodologies of the various techniques of handling ice, a description of some of them will contribute to an appreciation for the advantages of the present invention.

Most traditional ice handling methods have common basic functionalities which have grown out of traditional methods and have not been efficiency optimized.

For example, automotive windshield de-icing is relatively slow and inefficient. It relies upon convection from hot air, which is the result of a number of inefficient conversions starting with engine crank-case heat. That heat is conductively picked up from re-circulating coolant which is slow to heat to a useful temperature. The warm or hot coolant is then circulated through a heater core having fins through which air is fan-forced to blow onto the inside of the windshield surface. Depending on the ambient outdoor temperature, it is not unusual for de-icing using this method to take three to ten minutes. In order for the ice to melt, the windshield must be heated above freezing temperatures. The convective air that is blown onto the inside surface of the windshield transfers its heat inefficiently to the windshield glass or other material. Once the windshield begins to warm from the inside surface, it must conduct the thermal energy through the thickness of the windshield material to the outside surface. This process in and of itself requires transition through the many layers that typically form modern windshields. As the windshield is heating up, it is also giving up large quantities of its heat energy to the atmosphere around the windshield, both in the interior and exterior of the vehicle. Ultimately, the temperature of the outside surface of the windshield rises above the 32 degrees F. (0° C.), the freezing point of water, and begins to melt the ice that has formed on the outside of the windshield. Although the thickness of the ice acts somewhat as an insulator, the ambient outdoor temperature is continually trying to refreeze the ice that has been melted by the warmth of the windshield. In summary, the process of melting ice in order to clear the windshield for safe vision is a very slow, indirect, and inefficient process. It also tends to be an uneven process because certain areas of the windshield warm faster than others. The inherent unevenness of the convective heating process from the defroster blower has a tendency to allow various areas to refreeze, especially in inclement conditions where temperatures often fall below freezing.

Also, the traditional air blown convective defroster in an automobile can be annoyingly noisy. During the warm up period, it also can cause a wind chill effect which is uncomfortable to the passengers.

The rear window of vehicles is often defrosted or de-iced with resistive electrical wires which are embedded into the windshield. This heating methodology is somewhat more direct in that the electrical resistance in the wires causes heat to be conductively transferred to the windshield glass in which they are embedded. This ultimately creates sufficient heat at the outside glass surface to exceed the melting temperature of ice. The warmed windshield conductively heats the ice which has formed on the outside of the window. When enough joules of energy have been absorbed by the ice to reach its transition temperature, the ice will begin to change to liquid water. This is a more direct method of warming the glass to melt and eliminate the ice, but it still requires heating the glass to a temperature that will ultimately melt the ice.

Some automobile manufacturers have tried incorporating the embedded resistive wires in the front windshield. It apparently has not been well accepted by consumers because of the wires which are annoying and distracting in the driver's field of view.

Other de-icing methodologies that have been used involve some form of mechanical breaking, cracking, or removing of ice. An example is employed in the airplane wing de-icing process. Norbert Weisend, Jr. et al. describe this type of de-icing technology for airplane wings in U.S. Pat. No. 5,112,011 wherein an air bladder system is integrated as the leading edge of the aircraft wing. Fluid is forced under pressure into the tubes that comprise the bladder such that the external shape of the bladder is changed. The shape change then cracks the thin sheets of ice in many locations so the ice can be swept off the wing surface by the fast moving air. Other similar systems exist. This technology, though, has many moving parts which dictate maintenance and potential failure modes. The system also represents a substantial additional weight that the aircraft must carry aloft. Perhaps more importantly, the viability of such a de-icing system in severe icing conditions has been recently questioned.

Another common way of controlling ice is by treating it chemically. Such systems either seek to melt the ice directly or lower its freezing temperature to prevent ice formation. The chemical-based systems do not work well in many applications. For example, in-flight wing de-icing is not practically accomplished with such systems. Also, in some cases, chemical melting systems can cause ground water pollution issues and/or increase dependence on oil.

An aircraft de-icing system using lasers is described by William Nunnally in U.S. Pat. No. 5,823,474. The system describes a very powerful laser system which can be configured to scan the outer surface of the plane by way of mirrors, which direct the laser energy to potential icing surfaces. The system is extremely inefficient because it uses an external projection of long wave energy onto the wing and other surfaces of the plane which must completely melt 100% of the ice before the plane is ready to fly. Further, it must impart enough heat into the surface of the aircraft so that the ice does not immediately begin to reform.

Mr. Nunnally also describes, in U.S. Pat. No. 6,206,325, an on-board version of a similar system. Although this system is mounted on-board the aircraft, it still must scan over all surfaces that are to be de-iced and must melt 100% of the ice in order to have a satisfactory result. It has a massive disadvantage in that very powerful and heavy lasers and beam guiding equipment must be on-board the aircraft, thus creating a payload issue and a safety issue. Further, and more importantly, a bad rain or snow storm would prevent the laser from scanning the critical surfaces by disturbing and scattering the laser beam before it can reach its targets. This would render the de-icing system useless at a most needed time.

One thing that is common to all of the systems described above is that none of them directly inject heat energy into the ice at the interface with the surface supporting the ice. This is a major cause of inefficiency and it directly slows down the functionality of the de-icing or ice releasing systems.

SUMMARY OF THE INVENTION

An important object of this invention is to provide a direct and efficient way of de-icing or releasing ice from a substrate surface.

Another object of this invention is to provide a narrowband irradiation system and method which can melt ice by taking advantage of the absorption peaks of an element or compound from which ice may be formed or the ice itself.

Another object of the present invention is to provide an efficient de-icing or ice releasing system and method which can directly irradiate the interfacial ice on the substrate surface, thus turning it into water to provide easy release for the balance of the thickness of the ice.

In one aspect of the presently described embodiments, a system comprises (a) a substrate material which is approximately transmissive at irradiation wavelength(s) which will be employed and on which ice has formed, and, (b) irradiation producing devices operative to emit irradiation that passes through at least some portion of the substrate so that a first portion of the ice that is impacted by the irradiation is an interfacial portion nearest a surface of the substrate, the devices being proximate the substrate material, and selectively activated to effect irradiation, causing melting of at least some ice nearest the surface of the substrate.

In another aspect of the presently described embodiments, the narrowband irradiation producing devices are semiconductor devices.

In another aspect of the presently described embodiments, the narrowband irradiation devices are at least one of LEDs, LETs, and laser diodes.

In another aspect of the presently described embodiments the narrowband semiconductor irradiation devices are counted in an array on a planar mounting board.

In another aspen of the presently described embodiments the narrowband irradiation is approximately centered around a wavelength absorption peak in the absorption spectrum of the ice.

In another aspect of the presently described embodiments, a majority of narrowband irradiation energy is contained within a 400 nm range.

In another aspect of the presently described embodiments, majority of the narrowband irradiation energy is contained within a 50 nm range.

In another aspect of the presently described embodiments, the narrowband irradiation devices are laser diodes and the full width half maximum irradiation bandwidth is less than 20 nm.

In another aspect of the presently described embodiments, the narrowband irradiation devices are laser diodes and the full width half maximum irradiation bandwidth is less than 8 nm.

In another aspect of the presently described embodiments, the narrowband irradiation device is comprised of an SE-DFB laser diode and the full width half maximum irradiation bandwidth is less than 2 nm.

In another aspect of the presently described embodiments, the planar mounting board is designed to sink heat away from the irradiation devices mounted thereon.

In another aspect of the presently described embodiments, the planar mounting board is part of a cooling arrangement which uses fluid to help in carrying heat away.

In another aspect of the presently described embodiments, the fluid is at least one of a liquid coolant, a compressed gas coolant, a vapor change coolant, and a gas or air coolant to provide the cooling function for the irradiation devices.

In another aspect of the presently described embodiments, the cooling arrangement is designed to utilize the cool air from a high altitude environment to provide cooling function for the irradiation devices.

In another aspect of the presently described embodiments, the narrowband irradiation producing devices are digital semiconductor devices.

In another aspect of the presently described embodiments, the substrate material acts as a light pipe.

In another aspect of the presently described embodiments, the method comprises (a) providing a substrate on which ice is formed to be deiced, (b) positioning narrowband irradiation producing devices such that irradiation will pass through the substrate on which the ice is formed before it strikes the ice, and, (c) irradiating an interfacial layer of the ice through at least some portion of the substrate with narrowband radiant energy.

In another aspect of the presently described embodiments, the narrowband radiant energy is in the infrared wavelength band.

In another aspect of the presently described embodiments, the narrowband radiant energy is applied at a local absorption peak wavelength according to the ice material's absorption spectrum.

In another aspect of the presently described embodiments, the narrowband radiant energy employed is largely contained within a 400 nm bandwidth.

In another aspect of the presently described embodiments, the narrowband radiant energy is largely produced within a 20 nm overall bandwidth.

In another aspect of the presently described embodiments, the narrowband radiant energy is produced by an array of semiconductor devices.

In another aspect of the presently described embodiments, the semiconductor devices are comprised of at least light emitting diodes, light emitting transistors, or laser diodes.

In another aspect of the presently described embodiments, the narrowband radiant energy is produced by surface emitting laser diodes devices In another aspect of the presently described embodiments, the narrowband radiant energy which is employed is at approximately one of 1,456 nm, 1,950 nm or 2,400 nm.

In another aspect of the presently described embodiments, the irradiating comprises a pulsing.

In another aspect of the presently described embodiments, the irradiating results in creating liquid, a thermal shock or cracking of the ice.

In another aspect of the presently described embodiments, the method comprises (a) providing a substrate item having an exterior surface on which ice has formed to be at least partially deiced, wherein a material comprising the said substrate is highly transmissive at an irradiation wavelength which will be employed and capable of total internal reflection, (b) close-coupling narrowband irradiation sources to at least one edge of the substrate material to provide a way of efficiently injecting narrowband irradiation at the irradiation wavelength into the substrate item, and, (c) activating the narrowband irradiation sources to create internal reflection of the irradiation such that the photons only escape the substrate item where the ice provides a path for escape by more closely matching the indexes of refraction of the substrate, thus irradiating the interfacial surface of the ice.

In another aspect of the presently described embodiments, the narrowband irradiation is in the infrared wavelength band.

In another aspect of the presently described embodiments, the narrowband irradiation is applied at a local absorption peak wavelength according to the ice material's absorption spectrum.

In another aspect of the presently described embodiments, the narrowband irradiation is largely contained within a 400 nm bandwidth.

In another aspect of the presently described embodiments, the narrowband irradiation is largely produced within a 20 nm overall bandwidth.

In another aspect of the presently described embodiments, the narrowband irradiation is produced by an array of semiconductor devices.

In another aspect of the presently described embodiments, the semiconductor devices are comprised of at least light emitting diodes, light emitting transistors, or laser diodes.

In another aspect of the presently described embodiments, the narrowband irradiation is produced by surface emitting laser diodes devices.

In another aspect of the presently described embodiments, the irradiation which is employed is at approximately one of 1,456 nm, 1,950 nm or 2,400 nm.

In another aspect of the presently described embodiments, the activating comprises a pulsing.

In another aspect of the presently described embodiments, the activating results in creating liquid, a thermal shock or cracking of the ice.

DETAILED DESCRIPTION

The present invention provides for a de-icing and ice release system and method incorporating Digital Heat Injection technology (DHI)—the fundamentals of which are detailed in a series of patents and/or patent applications including U.S. Pat. No. 7,425,296; U.S. application Ser. No. 11/351,030 (filed Feb. 9, 2006 as a continuation of U.S. Pat. No. 7,425,796; U.S. application Ser. No. 11/448,630 (filed Jun. 7, 2006); U.S. application Ser. No. 12/135,739 (filed Jun. 9, 2008); U.S. Provisional Application No. 61/224,822 (filed Jul. 10, 2009) (now corresponding to U.S. Ser. No. 12/834,742, filed Jul. 12, 2010); U.S. Provisional Application No. 61/224,765 (filed Jul. 10, 2009) (now corresponding to U.S. Ser. No. 12/718,919, filed Mar. 5, 2010); U.S. Provisional Application No. 61/231,944 (filed Aug. 6, 2009) (now corresponding to U.S. Ser. No. 12/852,311, filed Aug. 6, 2010) and, U.S. Provisional Application No. 61/157,799 (filed Mar. 5, 2009) (now corresponding to U.S. Ser. No. 12/718,899, filed Mar. 5, 2010), all of which are incorporated herein by reference in their entirety. In at least one form, the contemplated system and method is a digital, narrowband, semiconductor-based technique for dealing with ice by directly injecting radiant energy into the portion of ice that is directly in contact with its supporting structure.

According to the presently described embodiments, the system comprises an irradiation source comprising, in one form, one or more semiconductor, narrowband irradiation devices with a carefully chosen output wavelength. The output wavelength is chosen so that it corresponds to or matches both the absorption peak(s) of ice and/or water (or another frozen substance) and a highly transmissive wavelength of the substrate on which the ice has formed. The array is fundamentally positioned (e.g. the devices are proximate the substrate in a suitable position and configuration) so that it can be selectively activated to irradiate through the transmissive supporting substrate, such that the narrowband output radiation is readily absorbed on the surface of the ice. Thus, the interfacial ice (e.g. the portion of ice nearest the substrate surface on which it rests) is, in one form, the first portion of the ice impacted by the irradiation and is melted into a slippery liquid water. With a melted, thin layer of water between the host substrate and the ice, the ice can be easily separated from the host substrate material. The liquid water interface acts as a lubricant, such that one of many described modalities, and others, can easily remove the ice from the surface. Gravity, wind, wipers, centrifugal force, and many other means can then act upon the ice which may have previously been frozen to the host substrate surface. Also, a material or coating may be added or applied to the substrate surface that will enhance the lubricant function when the ice melts to water, for example, at the interface. In the case of an airplane wing, such a coating may be added, for example, during normal de-icing on the ground.

Figure 1:
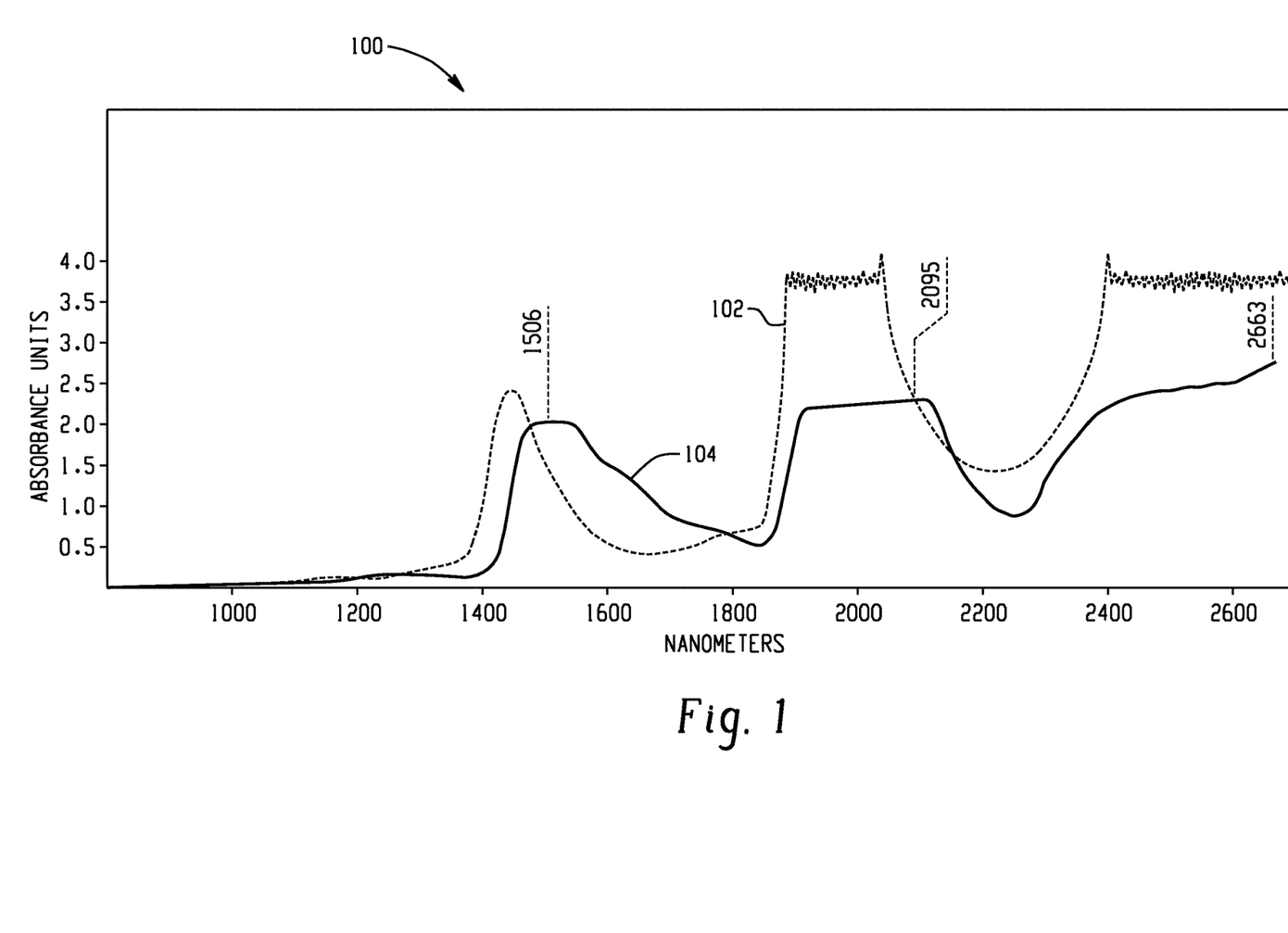
FIG. 1 is a graph showing absorption curves for water and ice.

Referring now to FIG. 1, a graph 100 illustrating the spectrophotometric absorption signatures of water (102) and ice (104) is shown. Note the absorption peaks for water (102) at, for example, approximately 1450 nm (e.g. 1456 nm), approximately 1950 nm, and approximately 2400 nm. At least some absorption peaks for ice (104) are, for example, approximately 1506 nm, approximately 2095 nm and approximately 2663 nm. With this information, it is possible to choose many different substrates which are highly transmissive at those, and other, peaks for ice and/or water. For example, glass, most plastics, and many materials that may be chosen are highly transmissive at some of the ice and/or water absorption peaks. Often, materials which are only translucent or possibly totally opaque in the visible wavelength ranges will be highly transmissive at one or all of the ice and/or water absorption peaks indicated above. Thus, a practitioner in the art has much flexibility as to the materials which are used in a product design which positions one or multiple transmissive materials between the narrowband irradiation devices and the location where ice control is desired.

Many types of narrowband irradiation devices can be employed to practice this invention to achieve the desired wavelength of irradiation which, in at least one form, matches a desired absorption characteristic of ice and/or water and a transmissive characteristic of a material upon which the ice or water is supported. In at least some forms, the desired wavelength band is an infrared wavelength band. For example, the narrowband irradiation devices may employ wavelengths of approximately 1456 nm, 1950 nm, or 2400 nm (e.g. ±40 nm), as indicated above. At least some of these devices that can be used in manners according to the presently described embodiments are described in the previously filed patent(s) and patent applications relating to DHI technology noted above.

Figure 2:
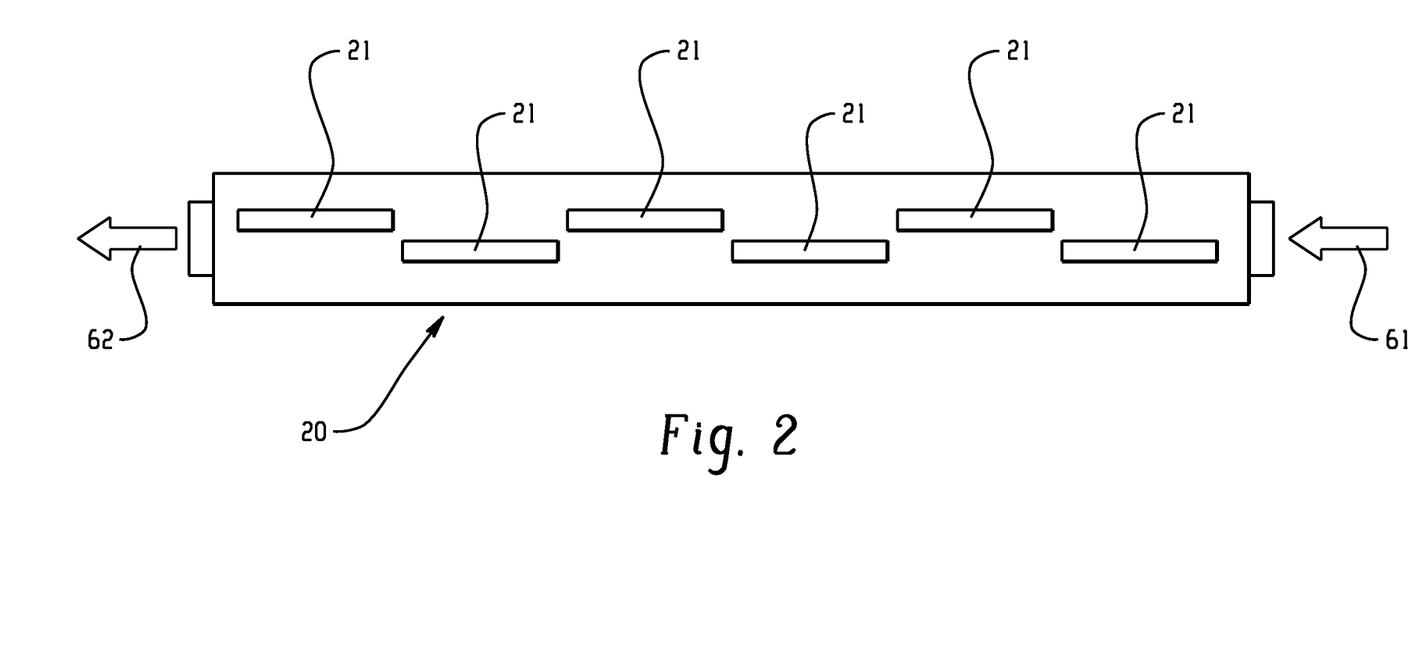
FIG. 2 is a view of an example array of narrowband irradiation devices that are implemented in various forms of the presently described embodiments.

With reference to FIG. 2, these devices may be provided in an array 20 on a support substrate or a planar mounting board and arranged in a variety of manners. The narrowband radiation devices 21, as shown, are arranged in an offset array pattern. Of course, other suitable arrangements may be employed. In this regard, arrays of semiconductor irradiation devices (e.g. such as digital semiconductor devices) which can be configured to exactly meet an application in at least one of wavelength, array shape, device shape, and irradiation pattern. In addition, the devices can be selected and arranged such that multiple wavelengths of the narrowband irradiation devices achieve specific results by way of the absorption/transmission balance while still achieving satisfactory ice melting results. In at least some embodiments, a controller ay be implemented to control the irradiation devices according to the presently described embodiments. The controller, in some forms, may simply activate and deactivate the arrays while, in other forms, more sophisticated control (e.g. pulsing, overpulsing, feedback, selective activation of devices or arrays, varying output of the devices or arrays including wavelength output, etc.) may be desired. The controller may take a variety of forms and be implemented using various software routines and/or hardware configurations that may reside in various suitable locations in, or in communication with, the systems according to the presently described embodiments. For example, the controller may be dedicated to the systems described herein or may be only a part of a larger system control scheme (e.g. in an automobile, in an intelligent appliance, or on an airplane). Further, a closed loop system that measures the temperature of the ice as the ice melts may also be provided. The temperature rises as the ice melts and the wavelengths emitted can be changed accordingly by the closed loop control system. The planar mounting board may be provided with a system to sink heat away from the irradiation devices mounted thereon. One example is a cooling arrangement using fluid to carry heat away. As shown, a cooling fluid input 61 and a cooling fluid output 62—which will allow for proper cooling of the substrate and irradiation devices during operation—are provided. It should be understood that the coolant could take a variety of forms, including a liquid coolant, a compressed gas coolant, a vapor change coolant or a gas or air coolant. Cool air from a high altitude environment may also provide a cooling function with or without the coolants. However, cool air may enhance the impact of the coolant, such as vapor change coolant.

It should be appreciated that the output of the irradiation devices is narrow enough in its bandwidth that it fits between or avoids the absorption peaks of the transmissive materials chosen. Bandwidths will vary based on many factors including the application, materials, equipment and design objectives. In at least one form, the narrowband irradiation is approximately centered around a wavelength absorption peak (e.g. a local absorption peak) in the absorption spectrum of, for example, the ice. An example desired bandwidth could be approximately 5 nm for some applications. In another form, the majority of narrowband irradiation energy is contained within a 400 nm range. In another form, the majority of narrowband irradiation energy is contained within a 50 nm range. In another form, the narrowband devices include, for example, laser diodes and the full width half-maximum irradiation bandwidth is less, for example, than 20 nm. In another form, the narrowband irradiation devices include, for example, laser diodes and the full width half-maximum irradiation bandwidth is less than, for example, 8 nm. In still another form, the narrowband irradiation devices comprise, for example, an SE-DFB laser diode and the full width half-maximum irradiation bandwidth is less than, for example, 2 nm.

Certainly LEDs, laser diodes, solid-state lasers, light emitting transistors (LETs), gas lasers, surface emitting laser diodes including SE-DFB (Surface Emitting Distributive Feedback) devices and other narrowband irradiation sources (some of which are referenced herein) would be possible irradiation devices for use with this invention. The semiconductor and solid-state based products indicated above would typically be easier to implement and more compact but any type of narrowband device could be employed if it fit the application well. The same concept applies for melting ice of many different compounds or elements.

The fact that the irradiation energy passes through the transmissive material and is directly absorbed on the surface of the ice and/or water is fundamental to the efficiency of the invention. Excess energy is not, therefore, wasted by heating the substrate on which the ice is forming. Rather, heat or radiation goes straight to the melting of the interfacial ice which then turns to liquid water.

In general, and in one form, a method according to the presently described embodiments comprises providing (or selecting or determining) a substrate on which ice is formed to be deiced, positioning narrowband irradiation producing devices such that irradiation will pass through the substrate on which the ice is formed before it strikes the ice and irradiating an interfacial layer of the ice through at least some portion of the substrate with narrowband radiant energy.

Figure 3:
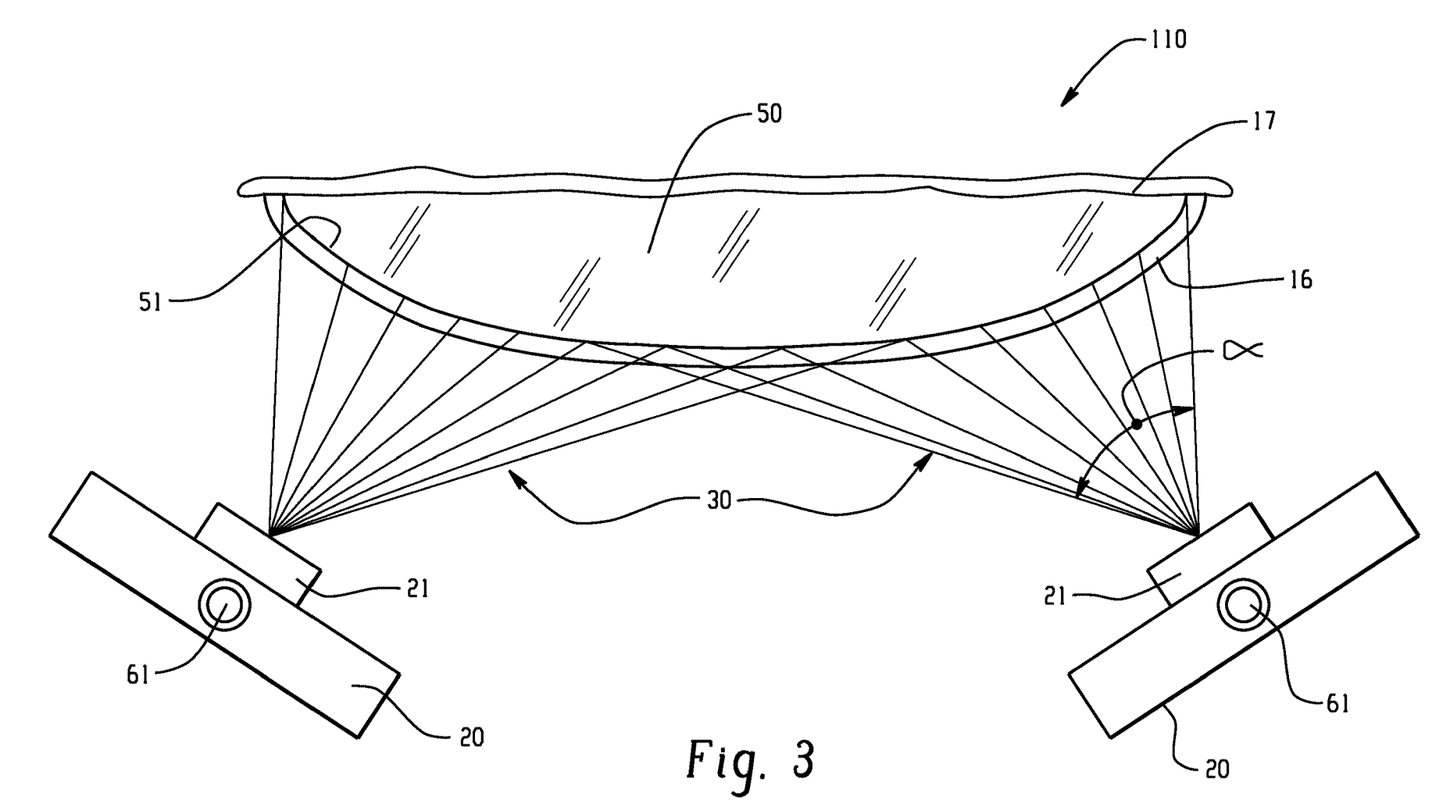
FIG. 3 is a cross-sectional view of an ice-making system implementing the presently described embodiments.

With reference now to FIG. 3, an ice-making system 110 includes a substrate material taking the form of an ice tray 16 formed of a transmissive material and narrowband emitting arrays 20. A controller (not shown) operative to control the arrays 20 according to the presently described embodiments may also be implemented. It will be appreciated that the ice tray 16 includes frozen water 50 filling the tray to a water fill level 17. Also shown is an interface 51 between the ice 50 and the tray 16. It will be appreciated that the ice melts to water at the interface 51 as a result of the generated irradiation pattern 30. The irradiation pattern 30 is generated by the arrays 20. In one form, as described above, the arrays 20 include narrowband irradiation devices 21 and cooling fluid inputs 61, as shown.

In operation, in an example method according to the presently described embodiments, the arrays 20 emit selective narrowband wavelength radiation toward the ice tray 16 in an irradiation pattern 30. The irradiation is transmitted freely through the transmissive material of the tray 16, and is absorbed by the ice 50 such that the ice melts at the interface 51. Thus, the ice 50 can be released from the tray 16 with relative ease in any of a number of well-known manners.

Figure 4:
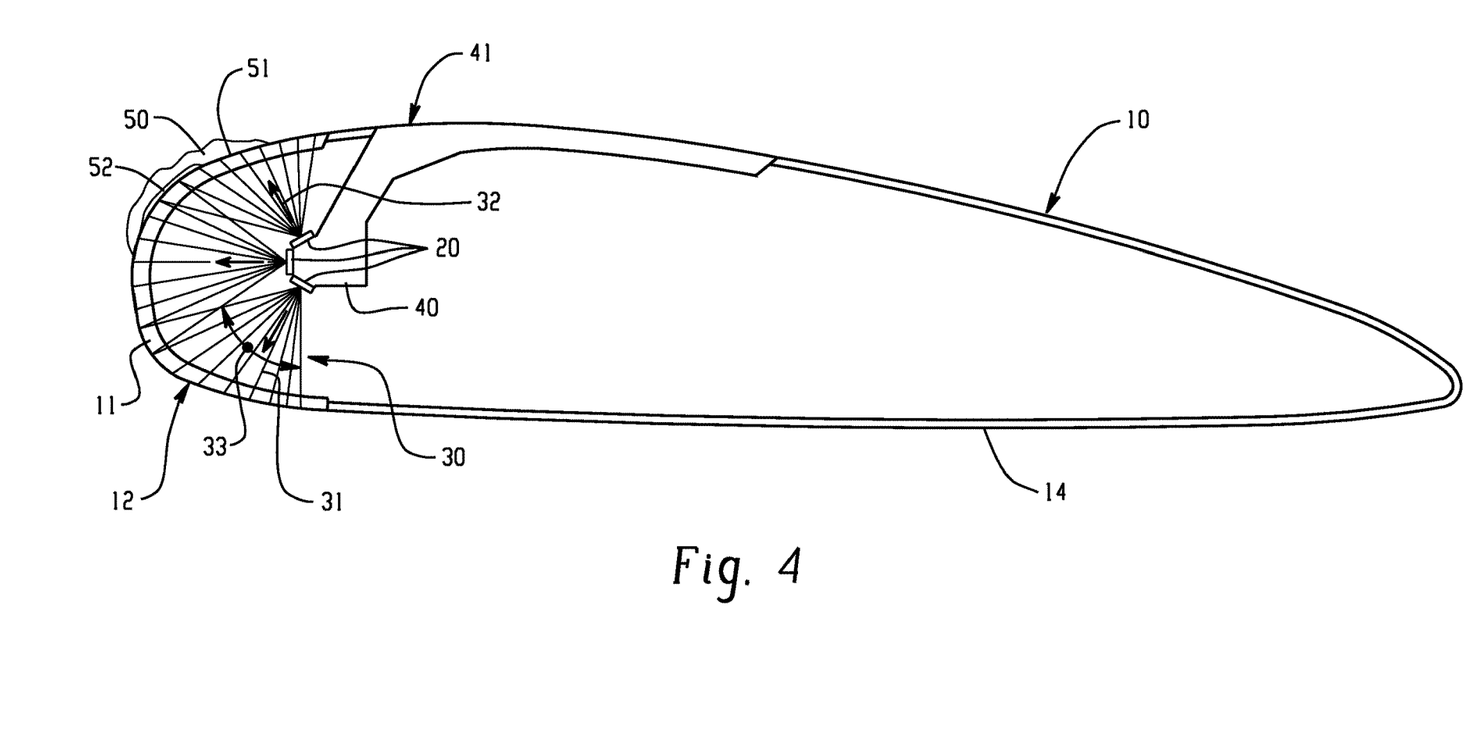
FIG. 4 is a cross-sectional view of an airplane wing implementing the presently described embodiments; and, FIG. 5 is a perspective view of a representative surface (e.g. an automobile windshield) implementing the presently described embodiments.

With reference now to FIG. 4, the cross-section of substrate material in the form of an airplane wing 10 is illustrated. The wing 10 includes a lift surface 14, a leading edge 12 comprised of leading edge material 11 and a convective cooling surface 41. The other portions of a standard or conventional airplane wing that do not have a bearing on the presently described embodiments are not described for ease of reference.

It should be appreciated that the presently described embodiments may be implemented to address ice 50 that forms on the leading edge 12 of wing 10. According to the presently described embodiments, the arrays 20 are activated (by, for example, a controller—not shown) to generate irradiation 31 in an irradiation pattern 30. The irradiation 31 progresses outward from the arrays 20 in a general direction 32 but also has a divergence angle 33. So, the irradiation 31 generally progresses toward the leading edge 12 formed of leading edge material 11. The leading edge material 11, in at least one form, is highly transmissive to the wavelength selected for the irradiation 31. As shown, the irradiation 31 progresses through the transmissive leading edge 12 toward the ice 50 and melts ice at the interface 51 such that water 52 is formed at the interface 51. In this matter, the ice 50 simply slides off the leading edge 12 of the wing 10. Also shown is a cooling block 40 operative to provide suitable cooling to the arrays 20.

For some applications, a somewhat more complicated and sophisticated implementation of the technology is envisioned. For a variety of reasons depending on the application, it may be desirable to treat the host substrate as a light pipe. This would be especially desired where at least one dimension of the substrate is negligible compared to a much larger size in one or both of the other dimensions. An example would be an automotive windshield which has a relatively small thickness compared to the length and width dimensions. In this case, the approach used in connection with FIGS. 3 and 4 could be implemented whereby large arrays could be positioned across the entire windshield to melt the ice on the surface of the windshield, as described thus far. However, by implementing the technology as though the substrate is a light pipe, it is possible to couple the narrowband irradiation devices directly into one of the small dimension sides of the substrate.

Figure 5:
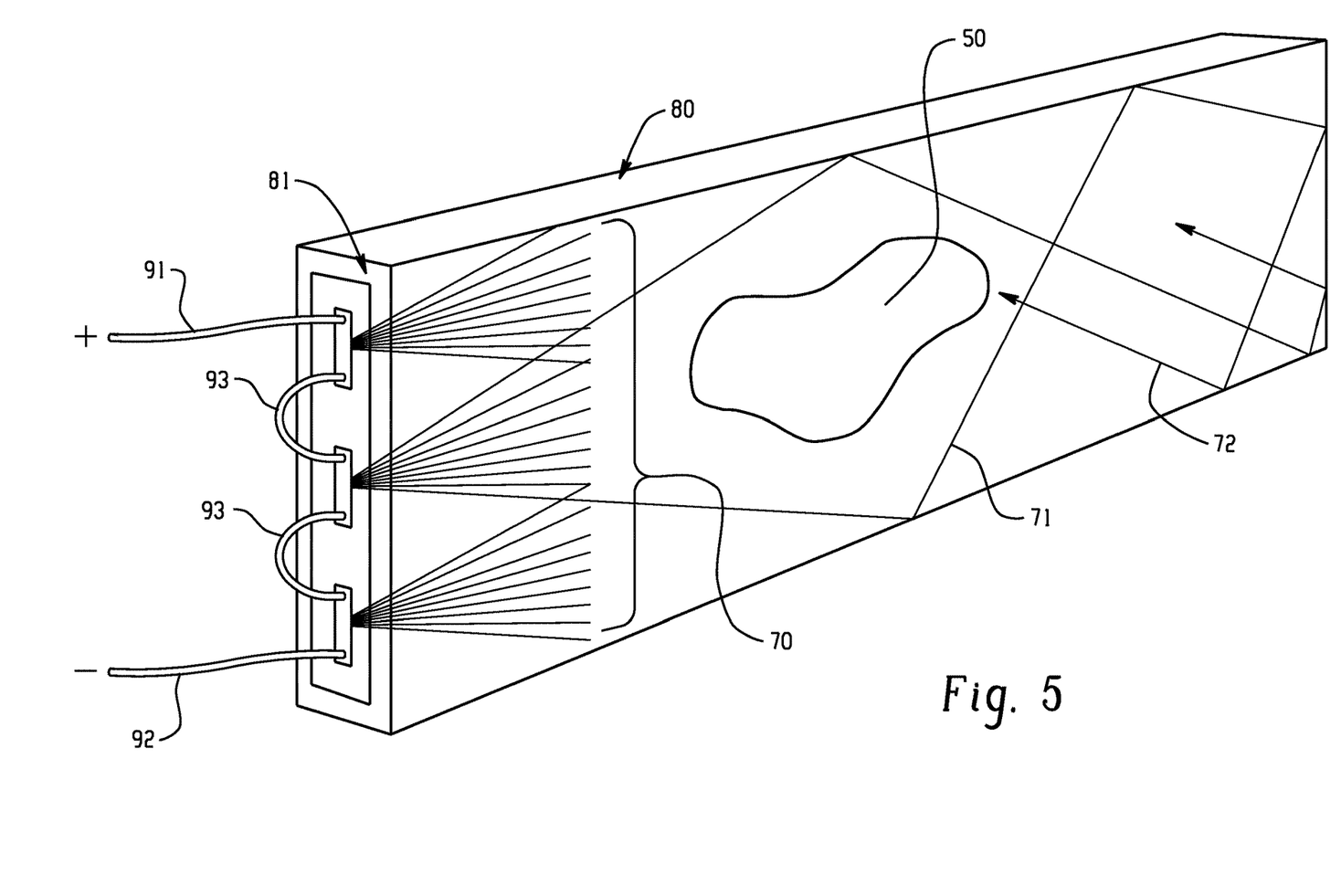

Again, using the example of a substrate material in the form of a windshield and with reference to FIG. 5, the narrowband irradiation device arrays 20 could be coupled to the small dimension, e.g. dimension 81 (e.g., the thickness) of the windshield 80. A power supply can be connected via connections 91, 92 and 93 to generate an output 70 for the arrays 20. As noted above, a controller (not shown) may also be provided to control the arrays. Because the index of refraction differential is large between the glass 80, which comprises the windshield, and the air, which borders the windshield on both sides, the reflections which occur inside the windshield keep the energy contained within it, as shown by rays 71. When another substance 50, such as the ice or water, is on the surface of the windshield 80, the index of refraction difference between the glass and the water or ice are much closer to one another and the energy can exit into the ice, as shown by rays 72. This technique acts as a selective filter so that energy only exits the windshield 80 through the ice with which it is in contact. Upon exiting into the ice, the radiation is immediately absorbed by the ice, which is highly absorptive at that wavelength. The ice then melts to water at the interface between the ice and surface.

This is thought to be a very efficient way of introducing energy into the substrate from a few smaller point source locations rather than through large arrays spread across the entire surface of, for example, a windshield. Thus, although the ice heating mechanism is similar, it adds the additional sophistication step of turning the substrate into an engineered light pipe.

It is anticipated that this internal reflection technique could also be an efficient technology for deploying this invention on airplane wing leading edges. It is envisioned that this technique could also be used for ice release in ice cube making systems. By designing the ice cube tray arrangement for total internal reflection, a quick melting of the interfacial ice completely surrounding the ice cube could take place simultaneously. It could be turned on quickly and turned off quickly so that excess heat energy does not warm the ice freezing compartment.

The irradiation could either be directly coupled into the substrate material from the narrowband device or fiber optics or other types of energy steering or energy guiding techniques could be used to couple the energy into the substrate. This would, of course, also be possible with the less sophisticated through technique that was first described.

In general, and in one form, a method implementing a light pipe approach according to the presently described embodiments comprises providing (or selecting or determining) a substrate item having an exterior surface on which ice has formed to be at least partially deiced, wherein a material comprising the said substrate is highly transmissive at an irradiation wavelength which will be employed and capable of total internal reflection, close-coupling narrowband irradiation sources (e.g. through configuration or position or arrangement of the sources or devices) to at least one edge of the substrate material to provide a way of efficiently injecting narrowband irradiation at the irradiation wavelength into the substrate item and activating the narrowband irradiation sources to create internal reflection of the irradiation such that the photons only escape the substrate item where the ice provides a path for escape by more closely matching the indexes of refraction of the substrate, thus irradiating the interfacial surface of the ice.

The narrowband irradiation described herein could be either continuous irradiation or pulsed irradiation. While continuous irradiation would allow the input of more joules of energy per unit timed, there are reasons why pulsed irradiation might also be desirable. Pulsing would typically require a smaller power supply since electrical energy can be stored in a capacitor and then released in a sudden burst periodically. It is also possible to over pulse many of the narrowband devices such as LEDs and laser diodes so that for short bursts a more intense pulse can be produced with the same devices. The same pulsed energy level which can be tolerated for a short duty cycle would typically over drive and burn out the devices if used continuously. Therefore, it is possible to get a higher amplitude pulse of energy for a short burst which could provide certain advantages such as a greater penetration depth.

By using substantial over pulsing it is possible to create a high thermal shock which may be more effective at cracking the ice as it also melts the surface. This must be learned from experimentation on any given application of the invention.

Another variation of the present invention would result by selecting substrate layers which have a chosen balance between transmission and absorption to provide optimal results for a given application.

Yet another variation of the present invention is a system engineered with multiple transmission layers with chosen absorption/transmission taking place in each layer before the energy reaches the ice.

Yet another variation of the present invention would result by activating special functionality from engineered materials which may be layered in the transmission area and activated at a particular stimulation wavelength.

Another variation of the present invention would result by activating special functionality in nano materials which may be used in the transmission layer composite and may be activated at a particular wavelength.

In another variation, at least one of a plurality of layers of a substrate on which ice is formed is stimulated to expand or bend at an injected or selected wavelength of energy to crack the ice for removal.

Also, in some variations, the system may be tuned to allow some heat to absorb into the substrate on which the ice is formed to aid in the melting process. That is, the substrate need not be 100% transmissive at the irradiation wavelengths in some applications.

Yet another variation of the present invention would result by incorporating narrowband semiconductor devices irradiating at eye-safe wavelengths for personnel and animal safety.

An advantage of the present invention is the provision of a technology which can be extremely selective and aim-able as it targets specific ice as needed for a particular application. Another advantage of the present invention is the ability to deploy the system in a more optimized way by utilizing the total internal reflection of a light pipe technique whereby the irradiation energy can escape the substrate transmissive material primarily into the ice as the indexes of refraction are more closely matched.

Another advantage of the present invention is fast functionality of the contemplated ice melting and ice release system and method.

Another advantage of the present invention is the ability to employ narrowband semiconductor emitting devices whose wavelength output is optimized for melting ice of a particular type.

Another advantage of the present invention is the ability to use a transmissive substrate of substantial thickness and not require heating the thickness of the substrate—but rather irradiate the ice directly through the substrate.

Yet another advantage of the present invention is the ability to directly inject ice controlling radiant energy which is neither conducted nor convectively coupled to the ice.

As the present invention has been taught and described above, it should be apparent that this ice melting technology works in a different way than traditional technologies—in that it is melting primarily the interfacial ice such that it can be easily removed from the substrate host surface. This should make for a substantially more efficient and faster ice removal or ice release system and method. This invention teaches a direct energy injection into the ice, not a conducted or convectively coupled system.

The invention claimed is:

1. A system for initiating a de-icing action on ice which has formed on a substrate material, the system comprising:
    (a) a substrate material which is transmissive for at least one selected wavelength corresponding to an absorption peak of ice and on which ice has formed;
    (b) irradiation producing devices operative to emit a first type of narrowband irradiation matching the at least one selected wavelength corresponding to an absorption peak of the ice, being transmissive through the substrate material and being within a range centered on approximately 1456 nm or 1950 nm, that passes through at least some portion of the substrate so that a first portion of ice that is impacted by the irradiation is an interfacial portion nearest a surface of the substrate, the devices being proximate the substrate material, and selectively activated to effect irradiation, causing melting of at least some ice nearest the surface of the substrate, wherein the irradiation producing devices are narrowband semiconductor irradiation devices mounted as an array on a mounting board; and,
    (c) a controller configured to control the irradiation producing devices, wherein the controller comprises a feedback system configured to measure the temperature of the ice and to change the output of the array based on measured temperature changes of the ice.

2. The system of claim 1 wherein the narrowband semiconductor irradiation devices are at least one of LEDs, LETs, and laser diodes.

3. The system of claim 1 wherein the first type of narrowband irradiation is approximately centered on a wavelength absorption peak in the absorption spectrum of the ice.

4. The system of claim 3 wherein a majority of the first type of narrowband irradiation energy is contained within a 400 nm range.

5. The system of claim 4 wherein a majority of the first type of narrowband irradiation energy is contained within a 50 nm range.

6. The system of claim 2 wherein the narrowband semiconductor irradiation devices are laser diodes and the full width half maximum irradiation bandwidth is less than 20 nm.

7. The system of claim 2 wherein the narrowband semiconductor irradiation devices are laser diodes and a full width half maximum irradiation bandwidth is less than 8 nm.

8. The system of claim 2 wherein the narrowband irradiation devices comprise an SE-DFB laser diode and a full width half maximum irradiation bandwidth is less than 2 nm.

9. The system of claim 1 wherein the mounting board is planar and designed to sink heat away from the irradiation devices mounted thereon.

10. The system of claim 9 wherein the planar mounting board is part of a cooling arrangement which uses fluid to help in carrying heat away.

11. The system of claim 10 wherein the fluid is at least one of a liquid coolant, a compressed gas coolant, and a gas or air coolant to provide the cooling function for the irradiation devices.

12. The system of claim 10 wherein the cooling arrangement is designed to utilize to provide cooling function for the irradiation devices.

13. The system as set forth in claim 1 wherein the semiconductor narrowband irradiation devices are digital semiconductor devices.

14. The system as set forth in claim 1 wherein the substrate material acts as a light pipe.

15. The system as set forth in claim 1 wherein the array is coupled to an edge of the substrate material to directly inject the first type of narrowband irradiation into the substrate material.

16. The system as set forth in claim 1 wherein the controller is configured to selectively activate/deactivate the devices in the array, cause pulsing, cause over-pulsing or vary the wavelength output of the array.

17. The system as set forth in claim 1 wherein the range is approximately +/−40 nm.

18. A system for performing a de-icing action on ice which has formed on a substrate material, the system comprising:
    (a) a substrate material which is transmissive for at least one selected wavelength corresponding to an absorption peak of ice and on which ice has formed;

(b) irradiation producing devices operative to emit a first type of narrowband irradiation matching the at least one selected wavelength corresponding to an absorption peak of the ice, being transmissive through the substrate material and being within a range centered on approximately 1456 nm or 1950 nm, that passes through at least some portion of the substrate so that a first portion of ice that is impacted by the irradiation is an interfacial portion nearest a surface of the substrate, the devices being selectively activated to effect irradiation, causing melting of at least some ice nearest the surface of the substrate, wherein the irradiation producing devices are narrowband semiconductor irradiation devices mounted as an array on a mounting board and wherein the array is directly coupled to at least one edge of the substrate material to directly inject the first type of narrowband irradiation into the substrate material; and, (c) a controller configured to control the irradiation producing devices, wherein the controller comprises a feedback system configured to measure the temperature of the ice and to change the output of the array based on measured temperature changes of the ice.

19. The system of claim 18 wherein the first type of narrowband irradiation is approximately centered on a wavelength absorption peak in the absorption spectrum of the ice.

20. The system as set forth in claim 18 wherein the controller is configured to selectively activate/deactivate the devices in the array, cause pulsing, cause over-pulsing or vary the wavelength output of the array.

21. The system as set forth in claim 18 wherein the range is approximately +/−40 nm.

* * * * *